United States Patent [19]

Binge et al.

[11] Patent Number: 4,725,025
[45] Date of Patent: Feb. 16, 1988

[54] DEPLOYMENT SYSTEM

[75] Inventors: Derek S. Binge, Hamilton Square; John P. Kukon, Trenton, both of N.J.

[73] Assignee: RCA Corporation, Princeton, N.J.

[21] Appl. No.: 842,772

[22] Filed: Mar. 21, 1986

[51] Int. Cl.[4] .......................... B64G 1/44; B64G 1/66
[52] U.S. Cl. ...................................... 244/173; 52/121; 136/296; 136/245; 160/84 R; 343/895; 343/DIG. 2; 244/158 R
[58] Field of Search ................... 244/158 R, 160, 173; 160/84 R; 343/895, DIG. 2; 136/292, 245; 52/108, 121, 632, 645

[56] References Cited

U.S. PATENT DOCUMENTS

| | | | |
|---|---|---|---|
| 3,477,662 | 11/1969 | Anderson | 244/173 |
| 3,524,193 | 8/1970 | Auletta | 343/895 |
| 3,677,508 | 7/1972 | Dillard et al. | 244/1 SS |
| 3,737,912 | 6/1973 | Cribb | 343/880 |
| 3,783,029 | 1/1974 | Dillard et al. | 136/89 |
| 3,836,979 | 9/1974 | Kurland et al. | 343/895 |
| 4,068,238 | 1/1978 | Acker | 343/895 |
| 4,475,111 | 10/1984 | Gittinger et al. | 343/895 |
| 4,555,585 | 11/1985 | Behrens et al. | 244/173 |

FOREIGN PATENT DOCUMENTS 3215432 10/1983 Fed. Rep. of Germany ...... 244/173

OTHER PUBLICATIONS

Ness, "A Power Extension Package (PEP) for the Shuttle Orbiter", Proceed. of 14th Intersociety Energy Conversion Conf., Aug. 1979.
"Navy Expanding Its Space Command to Bolster Readiness," Aviation Week & Space Technology, Feb. 3, 1986, pp. 54-55.

*Primary Examiner*—Galen Barefoot
*Attorney, Agent, or Firm*—Clement A. Bernard, Jr.; Robert L. Troike

[57] ABSTRACT

A plurality of indexing brackets having indexing apertures are secured to a retractable boom in spaced relation. A like plurality of indexing bulkheads are hinged to a foldable panel array (or collapsible spiral antenna) at spaced hinge axes. The bulkheads have indexing prongs which engage the indexing apertures, the brackets pullings the bulkheads therewith as the indexing apertures and prongs engage. Force contact spring motors urge the brackets and bulkheads together in the engaged state. Alignment guides align the brackets and bulkheads during engagement and disengagement of the indexing apertures and prongs.

21 Claims, 17 Drawing Figures

DEPLOYMENT SYSTEM

This invention relates to deployable systems and, more particularly, to deployable solar array panels and antennas for a spacecraft using an extensible boom.

Deployable solar array panel structures, as used with spacecraft, generally include a number of relatively large panels hinged at parallel axes. The panel array is attached at one end to a spacecraft. The panels, during launch of the spacecraft, are folded accordion like, one over the other, with the panels facing one another. When the spacecraft reaches its orbiting position, the panel array is released permitting the panels to unfold and deploy.

One deployment system utilizes spring loaded hinges which unfold the released panels and are described, for example, in U.S. Pat. No. 4,133,502. However, such hinges in a relatively long deployment system, for example, 60 feet or more utilizing an array of eight foot long panels, may allow bending of the array in response to acceleration of the satellite during stationkeeping maneuvers. Such bending motions tend to interfere with satellite control. Thus, a relatively long array requires a relatively stiff support boom not provided by such hinges. The spring loaded hinges also have the disadvantage of not being retractable.

A second kind of deployment system utilizes linear extenders which are retractable. Examples of such systems are illustrated in U.S. Pat. Nos. 3,783,029 and 3,677,508. A linear extender includes a boom which comprises a strip of spring metal which is wound in flat condition on a motor driven reel within an actuator and is prestressed to automatically curl laterally into a tubular configuration as it leaves the reel. The boom exits from the actuator through a guide which is sized to slidably receive the boom in its tubular configuration. The actuator motor is reversible to drive the actuator reel in either direction to extend the boom from or retract the boom into the actuator. Panels employed with such a system, however, as disclosed in the aforementioned U.S. Pat. No. 3,783,029, comprise a substrate which is preferably a thin film of Mylar, Kapton, or other plastic relatively lightweight material for receiving the solar cells. Mylar, Kapton, and other plastic supporting structure for a solar cell panel have certain drawbacks. For one, those substrates usually are required to be tensioned to increase their rigidity. Further, such substrate materials have relatively high coefficients of thermal expansion and, therefore, tend to exhibit large dimensional changes during exposure to widely varying temperature excursions.

Relatively rigid panels, which are more thermally stable than the thin film substrates, are more widely used with the spring loaded, non-retractable hinge type deployment system. These panels comprise composite materials such as aluminum or fabric honeycomb core material sandwiched between faces of composite fabrics as disclosed, for example, in U.S. Pat. No. 4,394,529. The more rigid panels tend to be heavier than the Mylar, Kapton, and other plastic substrates and, therefore, require a relatively strong support structure which can withstand bending due to inertial forces created in response to spacecraft accelerations induced, for example, by stationkeeping maneuvers.

Figures 10, 11, 12, 13:
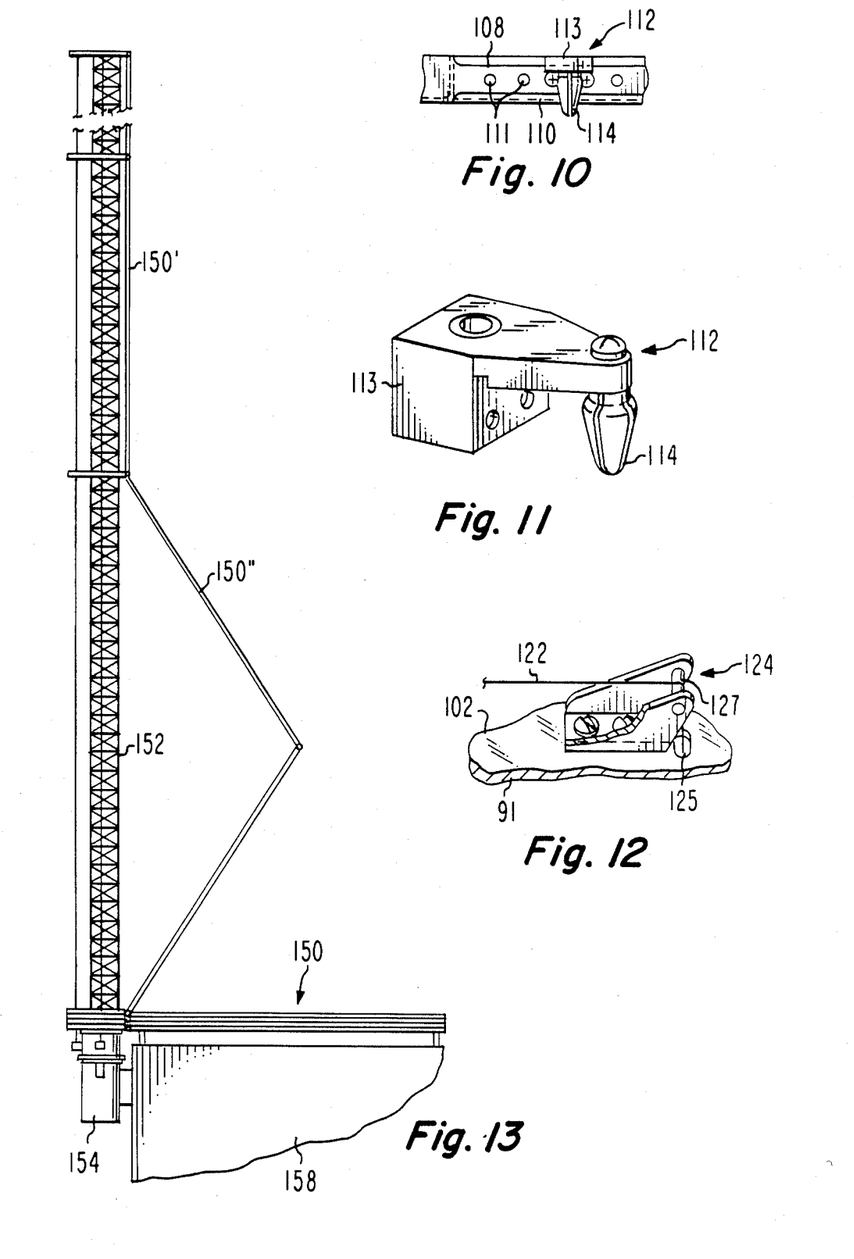
FIG. 10 is an elevation view of a portion of the structure of FIG. 9 taken along lines 10—10.
FIG. 11 is a more detailed isometric view of an indexing projection used with the structure of FIG. 10.
FIG. 12 is a more detailed isometric view of a cord guide assembly of the structure of FIG. 9.
FIG. 13 is a side elevation view, somewhat schematic, of a second embodiment of the present invention with the solar cell panels partially deployed.
Figure 14:
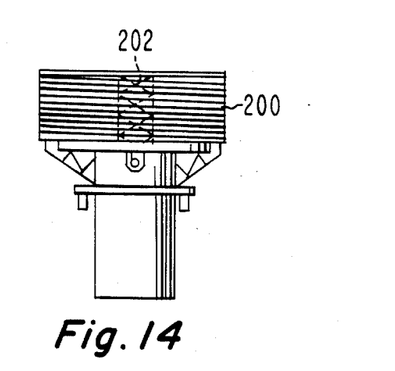
FIGS. 14–17 illustrate a third embodiment of the present invention.
Figure 15:
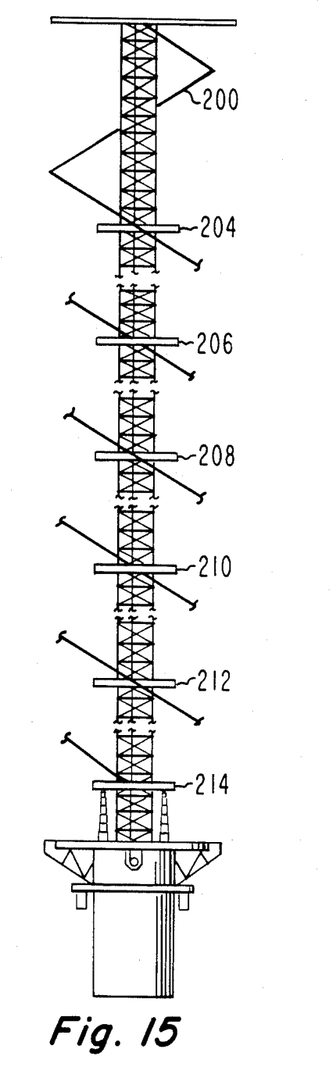
Figure 16:
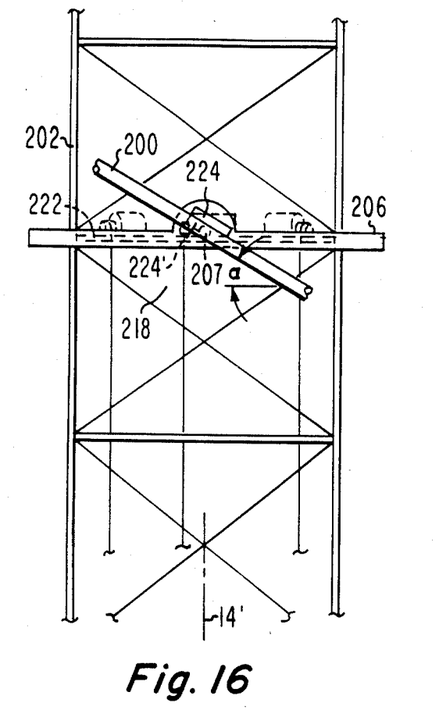
Figure 17:
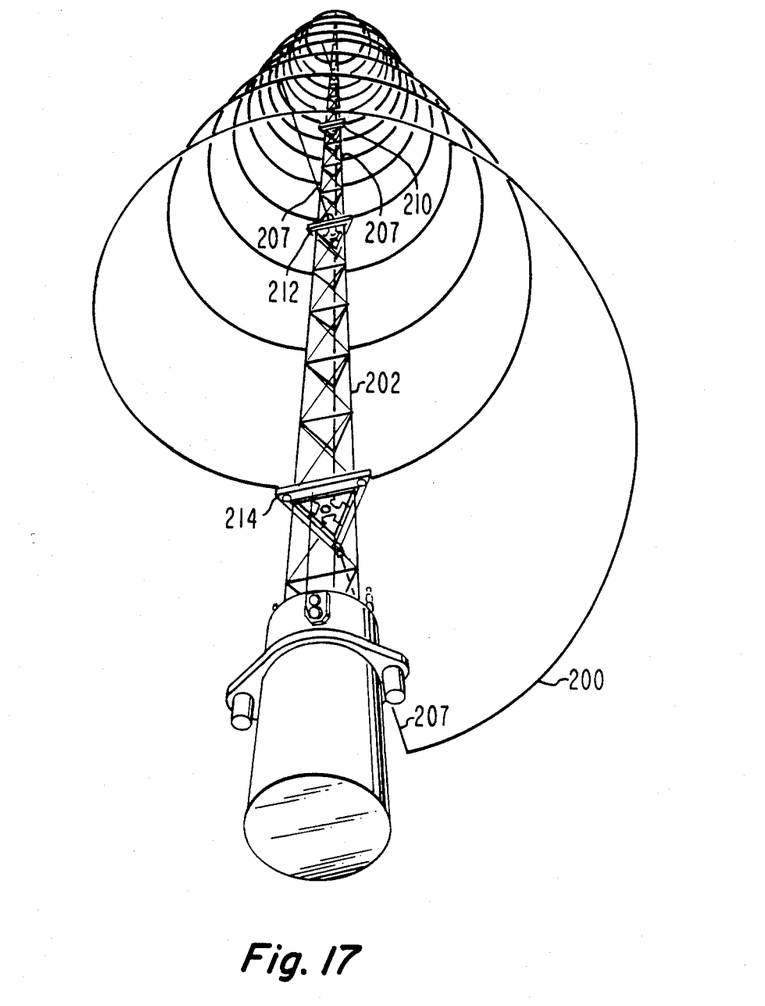

There is presently an additional commercially available self-erecting boom known as the "Astro mast." The Astro mast is depicted generally in FIG. 13 herein. The Astro mast is a relatively stiff structure when extended and exhibits minimum bending for relatively long extended lengths, e.g., 60 feet or more. This structure also has the advantage of being coilable into a relatively small volume of several cubic feet. That mast is generally used for deploying relatively lightweight radio antennas and the like at its extended end and is of relatively complex construction.

The present inventors recognize that the Astro mast is a relatively stiff structure and, therefore, is an attractive alternative as a support for solar array panels comprising composite materials employing honeycomb cores and the like as discussed above. A problem with deploying rigid solar array panels with a boom, such as the Astro mast, lies in attaching the solar array panels to the mast as it extends and retracts. The panels are not easily attachable to such a boom because of its relatively more complex structure and due to the need to minimize play between the array and mast to minimize undesirable motions during stationkeeping maneuvers.

There is a current need for a coilable helix antenna for use in the UHF bandwidth. Such an antenna can have a length of thirty feet or more. The helix angle of the coils is critical and must be maintained. The linear extender mentioned above is not applicable for this kind of antenna because the extender's metal structure tends to interfere with the antenna's radiation characteristics. The use of hinged posts for such an application becomes unwieldy for reasons similar to that mentioned above in connection with long panel arrays. As recognized by the present inventors, the solar array panel structures and the helix antenna, however, have a common structure; i.e., they are collapsible.

According to the present invention, a deployment system for a collapsible structure comprises a support and an extensible boom secured to the support. The structure is elongated and extended in the deployed orientation and collapsed and folded in the retracted orientation. First means pivotally secure an end of the collapsible structure to the boom adjacent to an end of the boom. Second means releasably secure selected spaced portions of the collapsible structure along its length to various points along the length of the boom with negligible play as the boom extends. The securing means also uncouples the selected portions from the boom as the boom retracts. The second means includes means for aligning the structure to the boom when the portions are uncoupled from the length of the boom. Means are coupled to the support and boom for selectively extending and retracting the boom.

Figure 1:
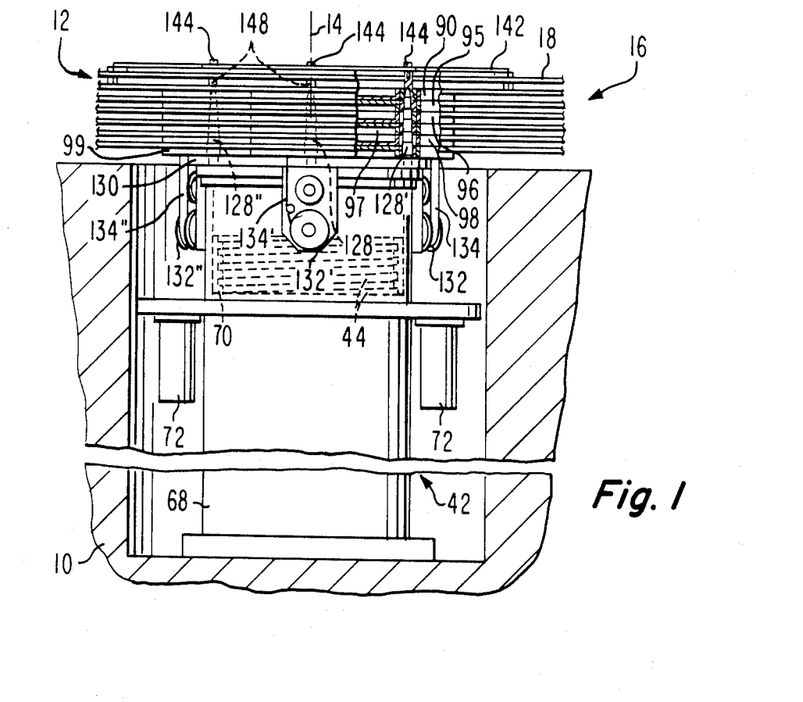
FIG. 1 is a fragmented side elevation view, partially in section, of a solar cell panel deployment system in accordance with one embodiment of the present invention.

In FIG. 1, spacecraft 10 is illustrated in a launch configuration carrying a folded stacked solar cell panel array system 12. The spacecraft 10 may carry one or more such systems. System 12 is symmetrical relative to axis 14 passing through the spacecraft 10 center of gravity. System 12 comprises a plurality of panels 16 hinged together at their edges along parallel hinge axes. End panel 18 is connected by hinges 146 to top plate 142 of boom 24, FIG. 2, along hinge axis 140. Plate 142 is trapezoidal and is secured to the end of boom 24, FIG. 3. In the stacked condition plate 142 rests above panel 18, FIG. 1, over a somewhat larger trapezoidal opening 147, FIG. 2, in panel 18. Plate 142 also has clearance openings 142' and 143' for devices attached to adjacent members when stacked.

End panel 18 also has a clearance opening $18_1$ for adjacent devices when stacked. Panel 18 is hinged at one end thereof to full size panel 19 at hinge axis 18', FIG. 3, which, in turn, is hinged to a pair of smaller panels 20 and 20', at hinge axis 19' and so forth. The pair of smaller panels 20 and 20' are spaced apart by distance large enough to permit them to unfold without interfering with boom 24. In the folded configuration, the full size panels are stowed on one side of boom 24 and the pairs of smaller panels are stowed on the other side of boom 24. The end panel 18 is larger than the remaining panels and covers the folded stack of panels. Panel 19 is less than half the area of panel 18 and, in particular, has a length dimension l which is less than half the length dimension l' of panel 18. Panels 20 and 20' have the same length which is greater than length l of panel 19. The difference in length l of panel 19 and the length of panels 20, 20' is the transverse dimension of the boom 24 so the panels have a symmetrical mass relative to axis 14 when folded.

A second pair of panels 21 and 21', each having the same length and width dimensions as panels 20 and 20', are hinged thereto on hinge axis 27. The set of panels 20, 20', 21, and 21' define a rectangular opening 23 slightly wider than the width of boom 24. Full size panels 26 and 28 are dimensioned the same as panel 19 and are hinged at respective parallel hinge axes 29, 31, and 35 as shown.

A set 30 of four smaller panels 30', 30'', $30_1$, and $30_2$ are dimensioned the same as the set of panels 20, 20', 21, and 21' and define an opening 32 similar to opening 23. Openings 23 and 32 permit the respective adjacent panels to fold past the boom 24 so that the boom is in the middle of the folded stack. Folded panels 33 and 34 have the same dimensions as and are hinged to panels $30_1$ and $30_2$ and, as shown, have not yet been unfolded. The remaining folded panels repeat the panel set 30 and panels 33 and 34 in the order illustrated.

The array of panels 16, when deployed, are on one side of the boom 24 with the solar cells (not shown) facing the viewer. In this way none of the cells are in the shadow of the boom and insure maximum power generation. In a communications satellite it is desirable that the solar array panels be deployed along an axis passing through the center of gravity of the spacecraft such as axis 14.

Figure 3:
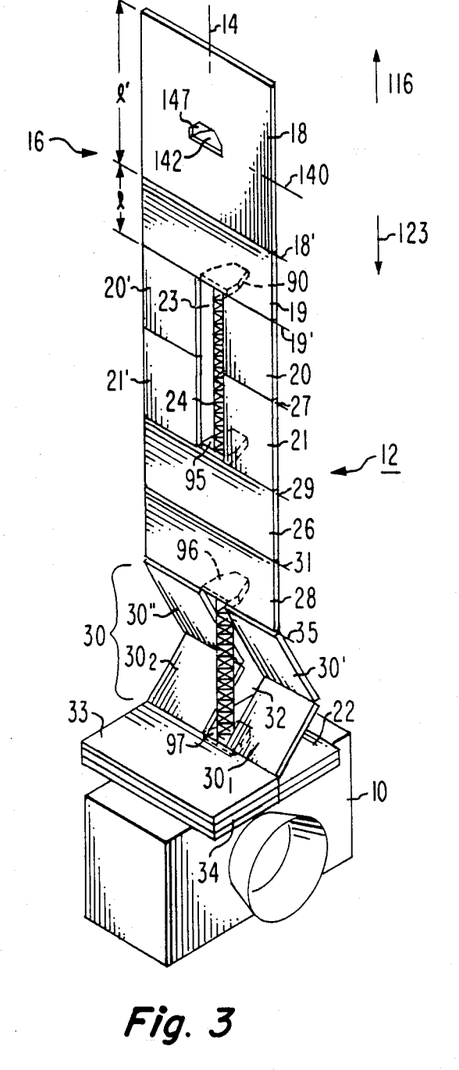
FIG. 3 is an isometric view of the embodiment of FIG. 1, somewhat schematic, illustrating the panels partially deployed.
Figure 5:
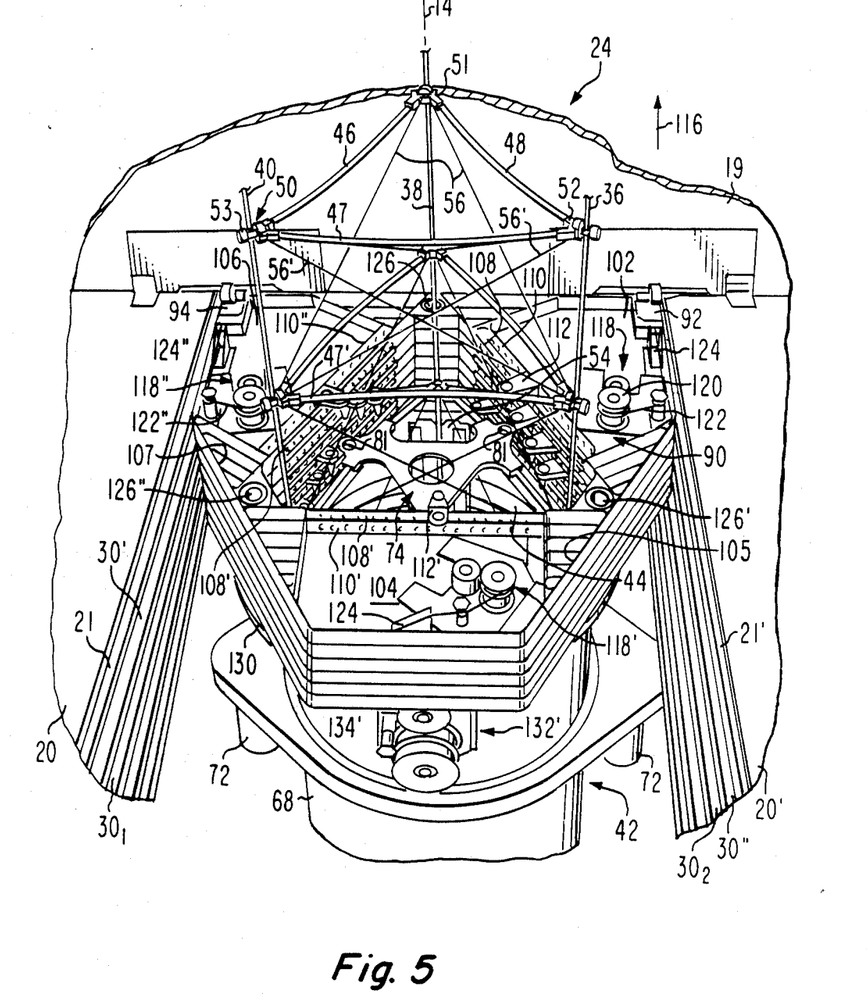
FIG. 5 is a perspective view illustrating the emergence of one panel coupling element of the embodiment of FIG. 1 which connects to a second panel coupling element for releasably securing the panels to an extensible, coilable boom.

The boom 24, FIG. 3, as mentioned in the introductory portion, in one implementation may be the Astro mast, which is commercially available. In FIG. 5, boom 24 comprises a set of identical flexible thermoplastic high strength rods, square in cross-sectional area, e.g., a fraction of an inch, which form longerons 36, 38, and 40 and a plurality of battens, e.g., 46, 47, and 48, which control the geometry of the deployed boom 24. While deployed, the batten elements are not permitted to fully straighten by virtue of the lengths of small diameter flexible wire struts, e.g., struts 56 that become taught. Boom 24 is relatively rigid when extended, but yet, is capable of being coiled, collapsed and flattened so as to fit within a small volume canister. For example, the boom 24 when extended may be 60 feet or more in length but yet can collapse into a volume of just several cubic feet.

The longerons 36, 38, and 40 are relatively stiff yet are sufficiently flexible so as to be coiled into a canister 42. The lower end of the longerons 36, 38, and 40 are secured to a wheel (not shown) rotatably secured to the bottom interior wall of canister 42. Canister 42 has three aligned rotatable interior helical longeron guide tracks 44 concentric about axis 14, each track simultaneously receiving and guiding a different one of longerons 36, 38, and 40.

In FIG. 1, canister 42 comprises a fixed cylindrical shell 68 and an internally mounted rotatable nut 70 in the upper part of the shell carrying the rotating longeron tracks 44. Nut 70 is rotated by a pair of drive motors 72 secured to shell 68. While the nut 70 is rotated its helical tracks 44 containing the longerons 36, 38, and 40 of the boom 24, FIG. 5, force the longerons into the lower part of the shell 68 cavity or out of the shell depending upon the nut direction of rotation. When the longerons 36, 38, and 40, FIG. 5, are driven out of the shell 68 they are driven parallel to axis 14 by three corresponding guides 54 (only one being shown), FIG. 5. The battens, e.g., battens 46, 47, and 48, are attached to the longerons forming a plurality of spaced triangularly shaped regions normal to axis 14. Each batten terminates at a connector attached to the corresponding longeron. For example, battens 46 and 47 are connected to connector 50, battens 46 and 48 are connected to connector 51, and battens 47 and 48 are connected to connector 52. Rotatably secured to each connector 50, 51, and 52 is a corresponding thermoplastic roller such as roller 53 at connector 50. The rollers 53 roll in respective ones of the three corresponding helical guide tracks 44, each track guiding a different longeron roller and are guided into the tracks by the three respective guide devices 54 having roller guide tracks parallel to axis 14. Each rectangular frame formed by a set of parallel battens 47, 47' and the bounded longerons such as longerons 36 and 40 are diagonally crisscrossed by a set of two struts, e.g., struts 56'.

Figures 7, 8, 9:
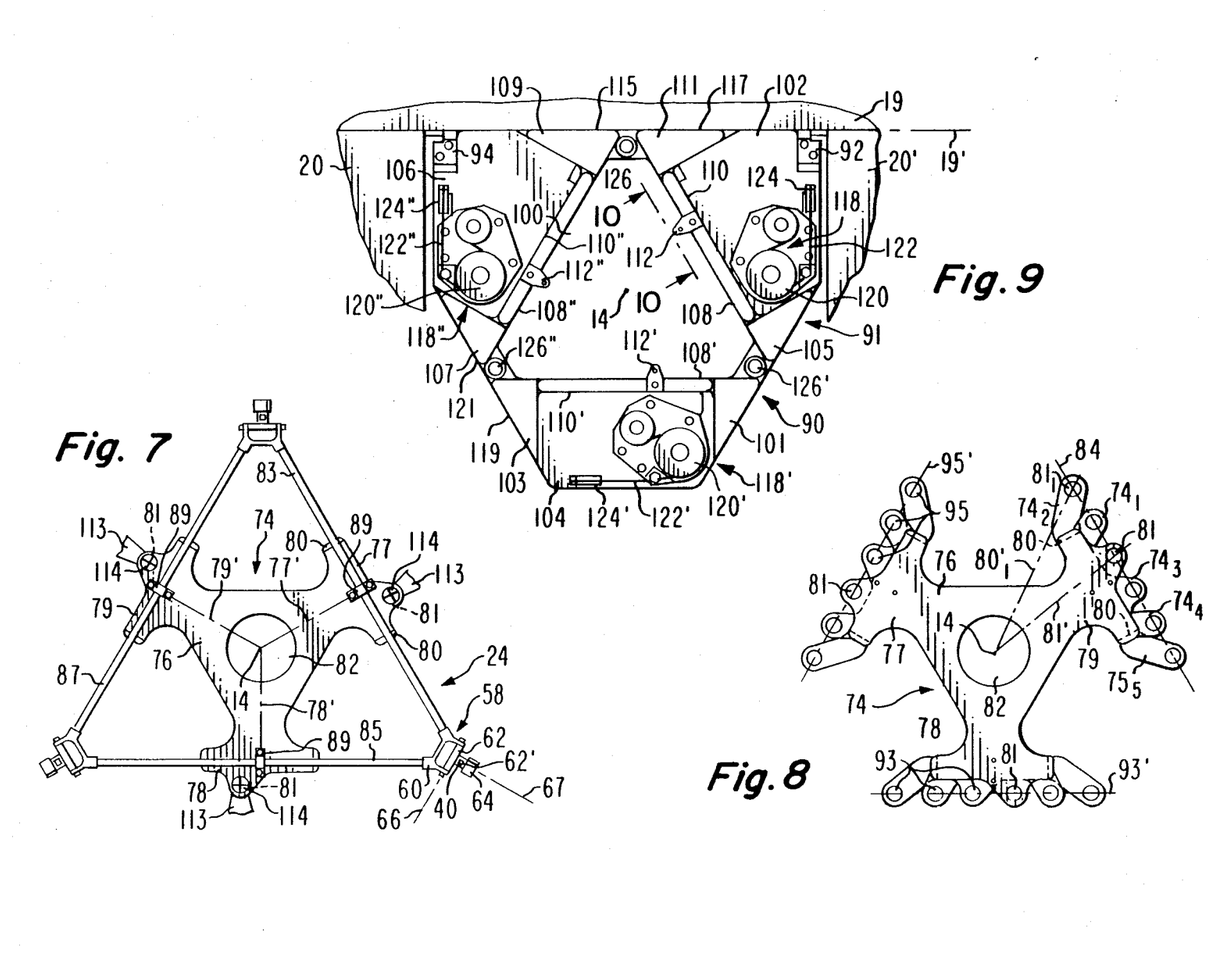
FIG. 7 is a plan view of one of the coupling elements secured to the boom taken along lines 7—7, FIG. 4.
FIG. 8 is a plan view illustrating several of the panel to boom coupling elements of FIG. 7 superimposed to illustrate their indexing arrangement.
FIG. 9 is a plan view of a second coupling element hinged to selected ones of the panels and adapted to releasably engage the coupling element of FIG. 7.

In FIG. 7, a typical connector 58 comprises a link 60 to which a pair of battens, e.g., battens 83 and 85, are secured. A body 62 is pivoted to the link 60 and roller 64 is rotatably attached to body 62. Body 62 can pivot about axis 66 relative to link 60. A longeron such as longeron 40 is bonded to a body 62' which can rotate about axis 67 relative to body 62. This construction permits the longerons 36, 38, and 40 to coil about axis 14, FIG. 5, while permitting the battens 46, 47, and 48 to remain connected to the respective connectors 50, 51, and 52. The battens 46–48 are dimensioned to bow somewhat outside the cavity of canister 42 when the boom is erected. Inside the cavity when collapsed, the struts 56, because they are flexible strings, collapse, permitting the battens to stack within the canister 42 cavity. The plane of the battens, such as, for example, the triangular plane formed by battens 46, 47, and 48 and the respective connectors 50, 51, and 52 remains relatively intact as the longerons are coiled into the canister 42. This is important for reasons explained below. Because of the inherent stiffness in the longerons and battens, the struts 56 and 56' on each side of the boom are stretched taut by the bowed battens which tend to straighten when the boom is erected, thus stiffening the boom. The boom and canister structure, as described so far, is commercially available.

Because the boom collapses within the canister 42, FIG. 5, the problem of coupling the panels 16, FIG. 3, to the boom as it erects itself from the canister with negligible play is not without difficulty. The mechanism for coupling the panels to the boom will now be described. The mechanism, generally, includes a plurality of aligned indexing bracket assemblies 74, $74_{1-5}$, FIGS. 4, 7, and 8, secured to the boom even when collapsed and a like plurality of mating corresponding bulkhead assemblies, such as assemblies 90, 95–99, FIGS. 1, 3, 4, and 9, each hinged at a given hinge axis, to a set of corresponding panels, e.g., at axes 19', 29, 35, and so forth, FIG. 3. The bulkhead assemblies remain hinged to the panels when the panels are stacked and released from the boom, FIG. 1, and, when the panels are attached to the boom and deployed, FIGS. 3 and 4.

As will be described in more detail below, the indexing assemblies each have a corresponding bulkhead assembly. Each indexing assembly releasably engages the corresponding bulkhead assembly as that indexing assembly emerges from the canister 42, FIG. 5, aligned with that bulkhead assembly, and disengage from the corresponding bulkhead assembly as the boom is collapsed into the canister. In the latter case, the bulkhead assemblies and panels automatically stack in a predetermined alignment as shown in FIG. 1. In the stacked condition, only the top panel 18 remains coupled to the boom via top plate 142; all of the remaining panels are completely free of any direct coupling to the boom, e.g., by way of hinges. However, the bulkhead assemblies when stacked, are aligned relative to the boom axis 14 and the indexing bracket assemblies by posts 128, 128', and 128'', secured to canister 42, FIG. 4, as will also be described in more detail below.

In FIG. 7, indexing bracket assembly 74 is secured to a set of battens 83, 85, and 87 lying in a plane. Indexing bracket assembly 74 comprises a triangular member 76 having a central opening 82 and three identical arms 77, 78, and 79 extending away from axis 14 along three equal spaced radial lines 77', 78', and 79', respectively.

Typical arm 77 includes a pair of spaced projections 80, an indexing aperture 81, and a U-shaped clip 89 screwed to arm 77 for securing the arm to batten 83. Arms 78 and 79 are similarly secured to respective battens 85 and 87. Projections 80 bow the battens in a given bias direction. When the boom 24 is erected as mentioned, the battens tend to bow. The biasing bow places the battens attached to the different indexing assemblies in the bowed state of the erect boom to preclude potential failure or binding of the system which might otherwise occur should the battens be clamped in place without a bow. That bowing action is necessary to stress the struts when the boom extends in the erect state. Because each bracket assembly, e.g., assembly 74, remains secured to the battens, e.g., battens 83, 85, and 87, when the boom 24 is extended and retracted, it is important that the triangular members, e.g., member 76, be dimensioned to fit within the canister 42 as the longerons are coiled.

In FIG. 8, the six different indexing bracket assemblies 74, $74_{1-5}$ are superimposed one over the other aligned on axis 14 to illustrate the relative positions of the spaced indexing apertures. The indexing apertures of each bracket assembly, such as apertures 81 of member 76, lie on different corresponding sets of radial lines extending from axis 14. One of apertures 81 lies on radial line 81', for example, aperture $81_1$, of member $74_2$ lies on radial line $81_1$', and so forth. All of the apertures 81, $81_1$, and so forth of the superimposed arms of the different bracket assemblies when viewed in a direction parallel to axis 14 are spaced and lie on a line, such as line 84. The apertures of the remaining arms, for example, the array 93 of apertures corresponding to arms 78 and so forth and the array 95 of apertures corresponding to arm 77 and so forth lie on respective lines 93', and 95' in similar spaced relation. It is to be understood that when the boom is extended the assemblies 74, $74_1$, $74_2$, and so on, are in spaced relation, one over the other, FIG. 4.

Figure 4:
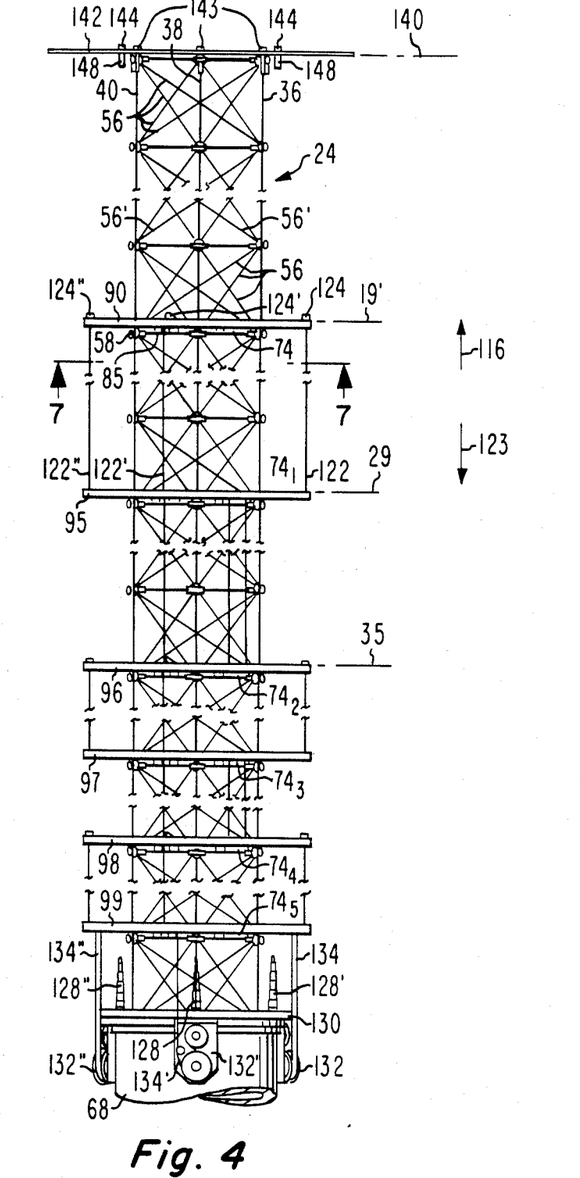
FIG. 4 is a fragmented elevation view of a portion of the embodiment of FIG. 1 with the panels omitted and the boom extended.

In FIG. 4, (the panels are omitted for simplicity of illustration) bracket assembly 74 is aligned adjacent hinge axis 19' of panels 19, 20, and 20' (FIG. 3). A second indexing bracket assembly $74_1$ is aligned adjacent hinge axis 29 of panels 21, 21', and 26. A third indexing bracket assembly $74_2$ is aligned adjacent hinge axis 35 and so on. Thus, an indexing bracket assembly is aligned adjacent to alternate hinge axes for the length of the panel 16 array, FIG. 3. In FIG. 4, the battens are connected underneath the indexing bracket assemblies with the clips, such as clip 89, FIG. 7, facing canister 42. In FIG. 5, because the indexing bracket assemblies are fixed to the boom, their indexing apertures 81 and so forth have a given orientation and alignment as they emerge from the canister 42 due to the alignment of the longerons by the tracks of devices 54.

In FIG. 9, representative bulkhead assembly 90 is hinged at the hinge axis 19' to panels 19, 20, and 20' by hinges 92 and 94 (see also FIG. 3). Hinge 92 secures assembly 90 to panels 19 and 20' and hinge 94 secures assembly 90 to panels 19 and 20. Bulkhead assembly 90 is representative of five additional bulkhead assemblies 95, 96, 97, 98, and 99, FIG. 4. Bulkhead assembly 95 is hinged to panels 21, 21', and 26, FIG. 3, bulkhead assembly 96 is hinged to panels 28, 30', and 30'', and bulkhead assembly 97 is hinged to panels $30_1$, $30_2$, and 33. Bulkhead assemblies 98 and 99 are hinged to additional panels not shown in FIG. 3.

Bulkhead assembly 90, FIG. 9, comprises a member 91 having a triangular central opening 100 and a plurality of spaced triangular openings 101, 103, 105, 107, 109, and 111. The same reference numerals with primes (') and double primes (") on a bulkhead assembly represent identical parts. Opening 100 is dimensioned to pass the boom 24, FIG. 7, therethrough along the boom axis 14; whereas the other openings conserve weight. Member 91 has three land regions 102, 104, and 106, interconnected by ribs, e.g., ribs 115, 117, 119, 121, and so forth, each region being spaced along a respective side of the triangular opening 100. Regions 102 and 106 are mirror images. Each land region borders on opening 100 with two similar parallel spaced ribs. For example, ribs 108 and 110 border region 102, ribs 108' and 110' border region 104 and so forth.

In FIG. 10, the ribs, e.g., ribs 108 and 110, bordering a land region, e.g., region 102 (FIG. 9) of each bulkhead assembly, have a linear array of identically spaced and aligned apertures of the same dimension. In FIGS. 5 and 9, secured to selected ones of the apertures 111 of ribs 108 and 110 is an indexing projection 112. Projection 112, FIGS. 10 and 11, has an L-shaped body 113 and a depending prong 114. The prong 114 comprises a tapered split pin dimensioned to closely engage in interference resilient fit one of the indexing apertures, e.g., aperture 81, of the bracket indexing assemblies 74, $74_1$–$74_5$, FIG. 8. The prong is resiliently compressed when engaged and this fit precludes play and looseness between the prong 114 and the mating aperture. The body 113 is threaded so it can be screwed to selected ones of apertures 111, FIG. 10, of the ribs, e.g., ribs 108 and 110. The body 113, fits between the ribs. Because the apertures 111 of all of the ribs 108 and 110 of each bulkhead assembly are identically spaced and dimensioned, a projection 112 is selectively secured to those apertures 111 which align prong 114 attached thereto with a mating aperture, e.g., aperture 81, of an indexing bracket assembly, as that bracket assembly emerges from the canister. A projection 112 is secured to each set of ribs, e.g., set 108, 110; 108', 110'; and 108", 110" of each bulkhead assembly. The prongs 114 of a given set are aligned to mate with the set of apertures of a corresponding indexing assembly; the alignment on the different bulkhead assembly being different so as to engage only its mating indexing assembly.

In FIG. 5, for example, the prong 114 extends toward the canister 42 and is aligned with an aperture 81 of the bracket indexing assembly 74 member 76 and engages that aperture as the boom ascends out of the canister in direction 116. The bulkhead assembly has three identical projections 112, 112', and 112", each secured to the corresponding ribs of the adjacent land regions 102, 104, 106 and are aligned to simultaneously engage the respective indexing apertures corresponding to aperture 81 of a given mating bracket indexing assembly as that bracket assembly emerges from the canister.

Secured to each of the land regions 102, 104, and 106 are respective identical contact force spring motors 118, 118', and 118". A typical spring motor comprises two reels mounted for rotation about parallel axes. A flat metal spring band has one end attached to one reel and a second end attached to the other reel. The band is normally wound on one of the reels and is connected to wind about the other reel as the other reel rotates. The rotation of the empty reel winds the band about it and causes the band to build up latent stresses which, when released, cause the band to rewind upon the reel about which it has unwound. Spring motors are widely known.

In FIG. 5, a reel 120 of high strength cord 122 is attached to the empty reel of the spring motor 118. An end of cord 122 is threaded to pass over roller 127 of guide 124, FIG. 12, and through an aperture 125 in region 102. The cord 122 free end is attached to the next adjacent bulkhead assembly member, e.g., assembly 95, FIG. 4. The cord 122, when extended, FIG. 4, is under tension induced by motor 118 which is stressed to rewind the cord 122 tending to pull assemblies 95 and 90 together. In similar fashion, the spring motors 118', 118" FIG. 9, have respective cords 122' and 122" similarly attached to assembly 95. Spring loaded cords 122, 122', and 122", FIG. 4, are positioned substantially symmetrical relative to axis 14, FIG. 9, to provide a uniform tensile load between bulkhead assemblies 90 and 95.

Because the boom 24 is being urged in direction 116 by the drive mechanism in canister 42, the spring load of cords 122, 122', and 122" in direction 123 pull the bulkhead assembly 90 and its corresponding projections 112, 112', and 112", FIG. 9, in a direction to maintain locking engagement of the prongs 114, FIG. 10, with the apertures 81 of the bracket indexing assembly 74, FIG. 5. This spring force loading thus keeps the mating bulkhead and bracket indexing assemblies engaged while the boom is extended. Similar spring motors, but of different sizes, are on each bulkhead assembly and are similarly attached to the next adjacent lower bulkhead assemblies in direction 123 toward canister 42.

The lowermost bulkhead assembly 99, FIG. 4, is resiliently pulled toward canister 42 in direction 123 by three spring motors 132, 132', and 132" which are secured to canister 42 outer shell 68. Motors 132, 132', and 132" pull on tapes 134, 134', and 134" secured to the lowermost bulkhead assembly 99. The forces exerted by the lowermost spring motors 132, 132', and 132" are the greatest and the forces exerted by the uppermost motors 118, 118', and 118" are the least. The springs motors of each bulkhead assembly increase in force magnitude, by way of example, by a factor of roughly 3 pounds for each bulkhead assembly closer to the canister 42. The forces exerted by motors 132, 132', and 132" may be, for example, 5 pounds each, that of the next motors 4 pounds each, the next motors 3 pounds each, and so on. These force differences are necessary so that the lowermost assembly of a coupled bulkhead assembly pair is pulled toward canister 42 against the pull of the spring motors of the uppermost bulkhead assemblies. That is, the motor of an upper bulkhead assembly tends to pull a lower bulkhead assembly in a direction 116 thus tending to disengage it from the engaged indexing bracket assembly. To preclude such disengagement, the motor of the next lower assembly pulls that assembly toward its next adjacent lower assembly with a greater force and so on until the lowermost bulkhead assembly is pulled toward the canister 42 with the greatest force. These motors thus insure all bulkhead assemblies and indexing assemblies remain engaged during deployment.

At the apexes of the triangular opening 100 of bulkhead assembly 90, FIG. 9, are three respective identical alignment apertures 126, 126', and 126". The apertures 126, 126', and 126" are dimensioned to be closely received by corresponding respective identical upstanding stepped posts 128, 128', and 128" secured to ring 130 on the upper rim of canister 42, FIGS. 1 and 4. Typical post 128' has a plurality of different diameter stepped shoulders. Aperture 126', FIG. 9, is dimensioned to closely engage the second smallest diameter uppermost shoulder. This permits the bulkhead assembly 90 to rest in spaced relation above the next lower adjacent bulkhead assembly 95 which rests on the next larger diameter shoulders of posts 128, 128', and 128" directly therebeneath. Bulkhead assembly 95, FIG. 1, has apertures corresponding to, but larger than, apertures 126, 126', and 126". Assembly 95 rests on a shoulder of post 128 which has a larger diameter than the shoulder upon which the bulkhead assembly 90 rests, and so forth. The posts 128, 128', and 128" each engage a different one of the apertures 126', 126", and 126, FIG. 9, respectively, when the bulkhead assemblies and the panels are in the folded stacked configuration of FIG. 1. This secures the bulkhead assemblies in spaced relation in the desired alignment relative to boom axis 14 and indexing assemblies 74 and so forth. The remaining bulkhead assemblies 95-99, inclusive, are constructed somewhat similarly as the assembly 90 of FIG. 9, differing by the size of the contact force spring motors.

Figure 2:
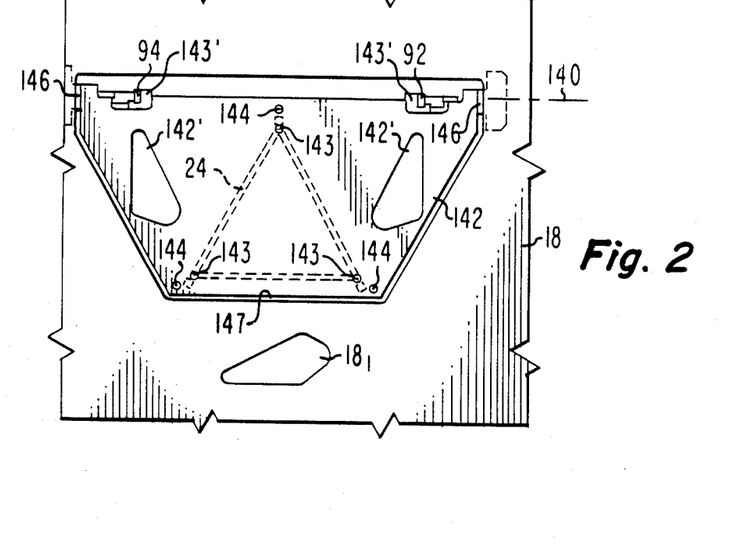
FIG. 2 is a plan view of the embodiment of FIG. 1.

In FIGS. 2 and 3, as mentioned above, the topmost panel 18 is secured to top plate 142 by hinges 146 along hinge axis 140, the top plate 142 being secured to the tip of the longerons of the boom 24 by screws 142 and connectors (not shown). Screws 144 secure a plurality of elongated standoffs 148, FIG. 1, to the top plate 142. The extended end of the standoffs 148 mate with the curved upper ends of the posts 128, 128', and 128". This locates and secures the upper plate 142 and the top panel 18 when the boom is retracted.

In operation, FIG. 1, the panels 16 and boom 24 are stored as shown with the panels folded in accordion fashion positioning paired panels with their solar cells facing in stacked alignment. The spring motors of the bulkhead assemblies, FIG. 9, are wound and the respective tensioning cords 122 and so forth, FIG. 4, are wound on their respective reels.

The bulkhead assemblies 90 and 95-99 are engaged with their respective posts 128, 128', and 128" and are locked thereto by locking bolts and/or straps (not shown) as normally employed in the art of securing solar cell arrays to satellites during the launch mode. The openings 142' and 18₁, FIG. 2, allow for projecting portions of the spring motors of the adjacent bulkhead assembly 90. The secured bolts and straps are released once the satellite is in orbit by pyrotechnic devices or other release mechanisms. Once the panels are released, the boom extension drive motors 72 are actuated and nut 70 is rotated, extending the boom 24, FIG. 5, which emerges from the canister 42.

Figure 6:
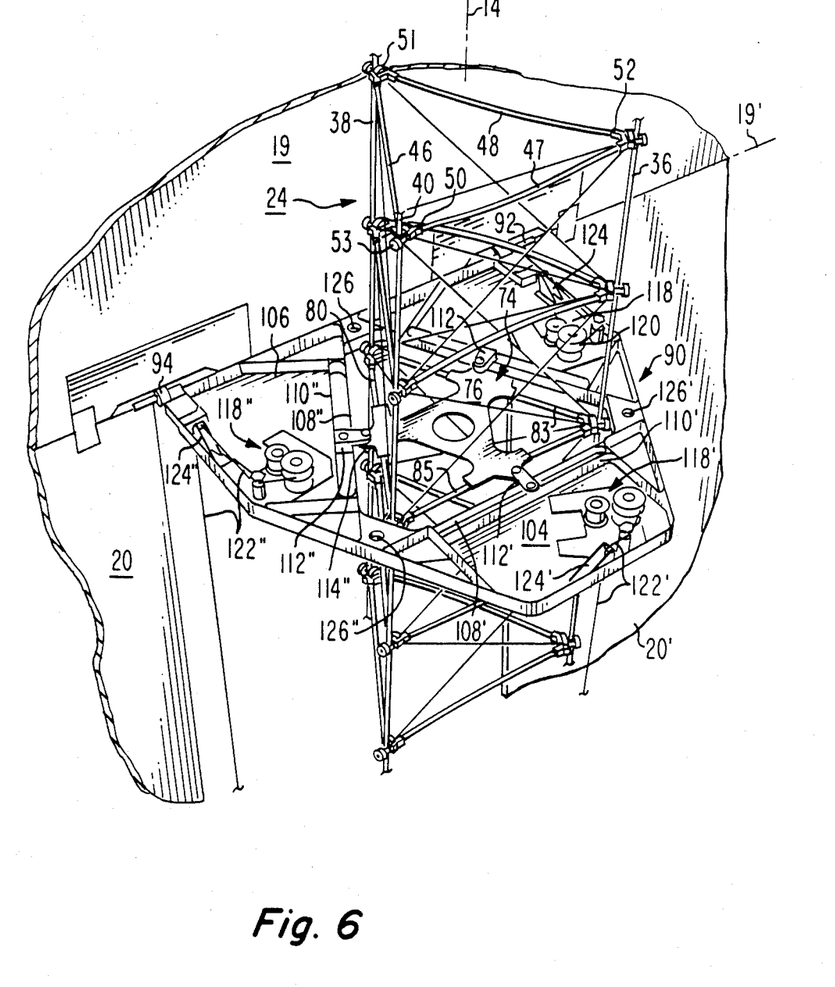
FIG. 6 is a perspective view of the panel and boom coupling elements of FIG. 5 after their engagement.

In FIG. 3, plate 142 initially lifts upward in direction 116 and lifts panel 18 hinged thereto, causing the panel 18 to unfold along hinge axis 18'. As the following panels unfold, FIG. 3, the uppermost bracket indexing assembly 74 attached to the boom 24 approaches the exit opening of the canister 42. Its indexing apertures 81 are aligned with the bulkhead assembly 90 prongs 114 of projections 112 by way of devices 54 and posts 128, 128', and 128" (FIGS. 4 and 5) and engage therewith simultaneously at three spaced points, FIG. 7. Continued displacement of the boom in direction 116, FIG. 5, causes the member 76 to push upward against the bulkhead projections 112 lifting the bulkhead assembly 90 therewith, FIG. 6. Because panels 19, 20, and 20' are hinged to the bulkhead assembly 90, these panels are automatically lifted as the bulkhead assembly is lifted by the indexing bracket assembly 74. This action automatically unwinds the spring motors on assembly 90 extending the cords 122, 122', and 122" under tension.

The boom 24 continues to move in direction 116 unfolding the panels as it continues its upward motion. The indexing apertures of the next bracket indexing assembly 74₁, FIG. 4, engages the three projections 114 of the bulkhead assembly 95, lifting that assembly upward, direction 116. The boom continues its upward motion and, in turn, each of the indexing bracket assembly indexing apertures engage the corresponding aligned projection prongs of the mating bulkhead assemblies, lifting those assemblies and their hinge attached panels. As the bulkhead assemblies are lifted, FIG. 3, each of the spring motors unwind stretching their reeled cords, inducing the tensile load between the mating bulkhead assemblies, FIG. 4.

In this way, all of the bulkhead assemblies are eventually disengaged from the canister 42, FIG. 1, and are placed in their spaced deployed position, FIG. 4. The extended boom 24 is rigid and can support the relatively heavy panels supporting the solar cells without detrimental bending. The advantage of this structure is that the boom 24 can be retracted, as desired, for folding the panels to their original stowed configuration, FIG. 1. Also, play between the bulkhead and indexing bracket assemblies is virtually eliminated by the tight fit of the prongs and mating apertures reducing the inertial moments of any slight play that might otherwise be present.

In FIG. 13, a second embodiment is illustrated in which the panels 150 are stored asymmetrical relative to the boom 152. In this case, the canister 154 is secured to an edge 156 of spacecraft 158. The panels, such as panels 150' and 150" all lie on the same side of the boom 152 and no central opening is required in the panels to receive the boom 152 when folded, such as, openings 23 and 32, FIG. 3. Thus, the panels can be stored both symmetrical and asymmetrical relative to the spacecraft's center of gravity in accordance with a given implementation.

In FIGS. 14-17, a third embodiment is illustrated in which a spiral wound antenna 200 (partially shown in FIG. 16) is stored symmetrically in a collapsed coil wound around the axis of boom 202. The boom lies within a circle whose diameter is roughly one-half the diameter of the deployed spiral antenna. The bulkheads 204-216 (FIG. 15) in this case are triangular and are connected at regular spaced intervals to the inside surface of the spiral antenna via pins 207 and connecting pin joints at each bulkhead, such as joint 218 on bulkhead 206, allowing rotation of the antenna about the pin axes. Pins 207 which couple the antenna to the bulkheads, are elongated rods rigidly secured to the antenna and pivotally secured to the bulkheads at the pin joints. Secured to each pin adjacent the pin joint is a stop flange 224'. The bulkheads 204-216 are, in turn, picked up from their stowed position by the extending boom 202 via the mating indexing brackets such as bracket 222, FIG. 16. Upon full deployment, the spiral angle α of the antenna with respect to the axis 14', of the boom is set by a mechanical stop 224 on the mating bulkhead which mates with the flange 224'. The stop 224 is at the desired angle of the deployed spiral, and therefore, locates flange 224', the mating pin 207 and thus the antenna at that angle. The pin rotates relative to the bulkhead via the pin joint 218 at the bulkhead. Antenna stowage is accomplished by retracting the boom into its canister thus collapsing the spiral into a close coiled spring like package. The boom in this case is made of radiation transparent material including the longerons, battens, struts, and connectors to preclude radiation distortion of the signals transmitted or received by the antenna. The pins and pin joints are also radiation transparent material. In the alternative, the pin joint can be at the antenna and the pin can be rigidly secured to the mating bulkhead. The stops here are located at the pin joint at the antenna.

What is claimed is:

1. A deployment system for a collapsible structure comprising:
   a support;
   an extensible boom secured to the support;
   a collapsible structure which is elongated and extended in the deployed orientation and collapsed and folded in the retracted orientation;
   a first means for pivotally securing the end of said structure to the boom adjacent an end of said boom;
   a second means secured to the boom and to the structure for releasably securing selected spaced portions of said structure to said boom at corresponding spaced locations along the length thereof with negligible play as said boom extends, and for uncoupling said selected portions from said boom as said boom retracts, said second means including means for aligning the structure to the boom when the portions are uncoupled from the length of the boom; and
   means coupled to the support and boom for selectively extending and retracting the boom.

2. The system of claim 1 wherein said means for releasably securing includes a plurality of first members secured to the boom in spaced relation in a given alignment and a plurality of second members, each pivotally secured to and corresponding to a different one of said selected portions, said support including alignment means for aligning said second members in a stacked array when said structure is collapsed in said given alignment, said first and second members including means adapted to releasably engage and disengage when in said given alignment to couple said first and second members with negligible play when engaged, each second member corresponding to a separate, different first member which couple as said boom extends and decouples as said boom retracts.

3. The system of claim 2 wherein said means adapted to engage and disengage include a prong on one of said first and second members and an aperture on the other of said members aligned and adapted to engage in compressive interference fit.

4. The deployment system of claim 3 wherein said first and second members are formed in sets, the prong and aperture of each set having a given alignment parallel to the direction of extension of the boom different than the alignment of the remaining sets of first and second members.

5. The system of claim 1 wherein said boom, when extended, lies on an axis, said first means for securing including means for attaching the selected portions to the boom such that the collapsed structure is symmetrical to and substantially normal to said axis when the boom is retracted and the structure when deployed is parallel to the axis.

6. The system of claim 1 wherein said boom, when extended, lies on an axis, said first means for securing including means for attaching the structure to the boom such that the collapsed structure, when the boom is retracted, is on one side of and substantially normal to said axis and the structure, when deployed, remains on said one side of and is parallel to the axis.

7. The system of claim 1 wherein the structure comprises a plurality of hinged panels which form a linear array when extended and are stacked one over the other when folded, said first means for securing including means for hinging selected ones of the panel hinges to said boom.

8. The system of claim 1 wherein the structure comprises a continuous antenna conductor forming a helix when extended and when collapsed.

9. A panel deployment system comprising:
   a support including panel alignment means;
   an extensible, collapsible boom secured to the support;
   means coupled to the support and boom for coiling the boom to a collapsed, retracted state and for uncoiling and extending the boom to an extended state;
   a plurality of panels pivotally secured to one another at parallel hinge axes such that they fold one over the other in a stacked state and form a linear substantially coplanar array in an unfolded state;
   means for pivotally securing an end panel of the array to the boom; and
   means adapted to mate with said alignment means for releasably aligning and securing selected ones of said panels to said boom as said boom extends from the retracted state and for decoupling said selected ones of said panels from said boom as said boom retracts such that said panels automatically fold and stack into said alignment as said boom retracts and attach to the boom and extend in said array as said boom extends.

10. The system of claim 8 wherein said panel alignment means includes a plurality of spaced guide posts secured to the support and a plurality of guide apertures coupled to said panels adapted to engage said posts when said panels are folded and stacked.

11. The system of claim 9 wherein said means for releasably securing said panels to said boom includes a plurality of first members secured to the boom in spaced relation and aligned such that said first members stack one over the other as said boom collapses; a plurality of second members, each pivotally secured to a different, corresponding one of said selected panels at selected ones of said hinge axes, said second members being adapted to stack one over the other in a given alignment when said panels are in the stacked state, each first member having a corresponding mating second member; said first and second members including releasably coupling means adapted such that each first member has said given alignment for engagement with its corresponding second member as said boom extends pulling that engaged second member and its corresponding panel therewith, said coupling means including means such that said first and second members disengage and stack as said boom retracts.

12. The system of claim 11 wherein the first members each include an array of apertures, each aperture array having a given alignment and spacing about said extended boom, said second members each including an array of projections having said alignment and spacing of its corresponding first member apertures and adapted to engage and mate with said corresponding member apertures.

13. The system of claim 12 wherein said first and second members include tensioning means for pulling adjacent ones of adjacent sets of said engaged first and second members in a direction tending to maintain said engagement.

14. Apparatus for deploying a coilable antenna comprising:
- a collapsible extensible mast structure comprising a fixed canister member, a rotatable nut member secured to the fixed member, drive means for rotating the rotatable member relative to the fixed member, and a collapsible mast secured to the first member extending parallel to an axis and coupled to the rotating member for coiling the mast into the canister member in a mast retracted state and for uncoiling and extending the mast from the canister member in the extended state;
- a plurality of first elements secured in spaced relation to the mast, said elements being shaped to stack in said canister member while remaining secured to the mast when the mast is in the coiled retracted state;
- a plurality of second elements, each corresponding to a separate, different first element;
- a collapsible, spiral antenna comprising a linear spiral element in one orientation and a folded coil in a second orientation;
- pivot means for pivotally securing said antenna to said second elements at selected spaced points along said antenna, said second elements being secured to said antenna such that when the antenna is collapsed, the second elements are stacked and aligned one over the other, and when the antenna is extended, the spacing of the first elements on the extended mast matches the spacing of said spaced pivot means, each said second elements including a central opening through which said mast passes; and
- coupling means secured to said first and second elements for releasably coupling said first elements to their corresponding second elements as the mast uncoils and extends and for decoupling said first and second elements as said mast retracts.

15. The apparatus of claim 14 wherein said coupling means includes a set of apertures on one of said plurality of first and second elements having a given alignment and a set of projections on the other of said plurality of first and second elements having said given alignment, the apertures and projections of each set of corresponding first and second elements being aligned to engage as said mast extends as the first elements emerge from said canister and pass adjacent to said corresponding stacked second elements.

16. The apparatus of claim 15 wherein said coupling means includes extensible spring means secured to said second elements and to said canister member for resiliently releasably urging said first and second engaged elements together.

17. The apparatus of claim 16 wherein said spring means includes a first spring set coupled to a first next adjacent second element and to the canister member, a second spring set coupled to said first next adjacent second element and a second next adjacent second element, a third spring set coupled to said second next adjacent second element and a third next adjacent second element and so on for each said second element.

18. The system of claim 17 wherein each said spring set exerts a force of a different magnitude than the remaining spring sets in decreasing magnitude away from the canister member.

19. The system of claim 17 wherein the force generated by each spring set differs from the force of the next adjacent spring set by a value of roughly 3 pounds.

20. The apparatus of claim 14 wherein said coupling means further includes alignment means coupled to said canister member for aligning the first and second elements during said releasable coupling and decoupling.

21. The apparatus of claim 14 wherein said pivot means includes a plurality of rods rigidly secured to one of the antenna and second elements and pivotally secured to the other of said second elements, said pivot means including stop means secured to a corresponding one of said antenna and said second elements and said rods for locating the extended antenna at a given angle relative to the longitudinal axis of the antenna concentric with the spiral thereof.

* * * * *